3,216,287
FINE-BORING TOOLS
Curt Pleger, Oberrieden, Zurich, Switzerland, Walter
  Clashausen, Remscheid, Germany, and Alfred Ganahl,
  Kloten, Zurich, Switzerland, assignors to Gebruder
  Honsberg, Remscheid, Germany
Filed June 2, 1964, Ser. No. 371,957
Claims priority, application Germany, June 4, 1963,
H 49,351
8 Claims. (Cl. 77—1)

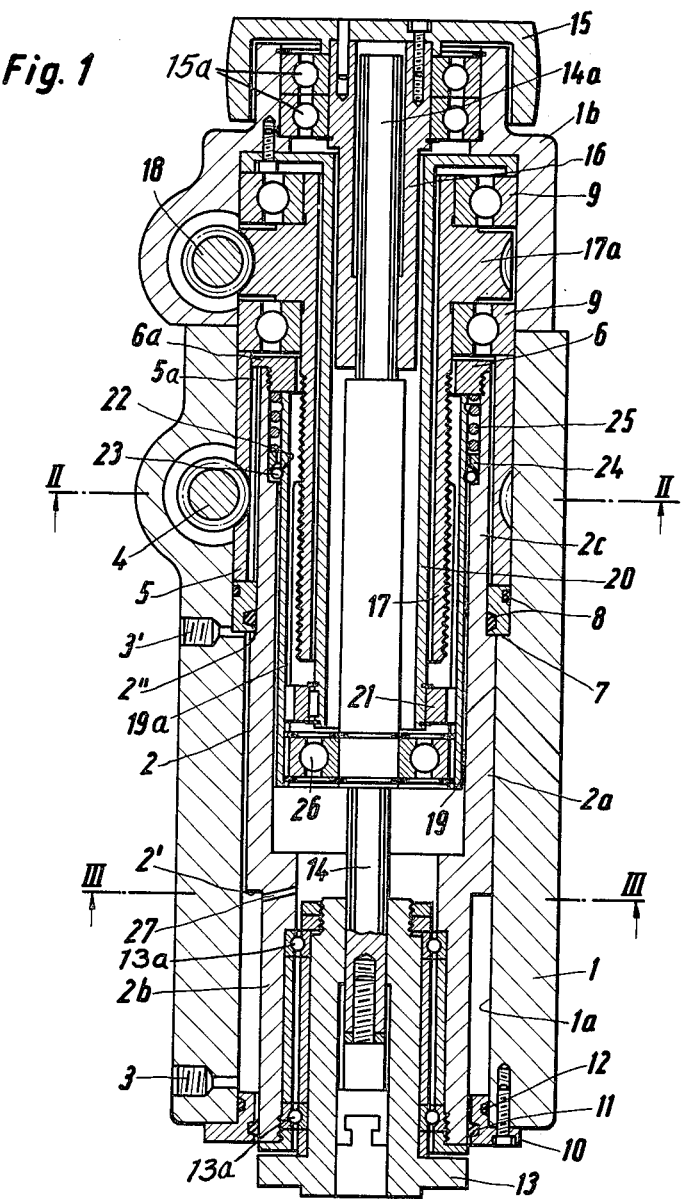

This invention relates to a fine-boring unit, with a spindle sleeve axially displaceable and guided in a guiding bore of the casing of the unit, in the end portion of which towards the tool end, which is of smaller diameter than the piston-like guiding portion of the spindle sleeve, the rotatably driven tool spindle is journalled without clearance and in an axially undisplaceable manner.

From new fine-boring machines or units, the highest geometrical accuracy of the bores to be produced is required, with the best possible surface quality. These requirements can for the most part only be met, taking economy into consideration, by employing hard-metal, diamond or ceramic cutting tools, which require very high cutting speeds, that is to say, the highest spindle speeds, with small feeds. Since the abovementioned cutting tools consist of comparatively brittle materials, their durability and edge-life depend decisively upon the freedom from vibration and oscillation of the fine-boring machines. The problem of the designer of fine-boring units accordingly consists essentially, on the one hand, in an accurately central axial guidance, as free from play as possible, of the slidable spindle sleeve in its guiding bore, which is decisive for the exactitude of the bores to be produced, as well as of the tool spindle in the spindle sleeve, and on the other hand in attaining a practically complete freedom from vibration even at the highest speeds of revolution of the spindle.

In known recent fine-boring units the tool spindle is journalled with practically no clearance within the spindle sleeve by means, usually, of ball or roller bearings clamped relatively to one another; and the spindle sleeve, in its turn, is guided in a very accurately cylindrically machined guiding bore of the casing, constructed with great rigidity, by means of a cylindrical spindle-sleeve guiding member of somewhat piston-like construction. The feeding of the spindle sleeve is effected either hydraulically, by means of oil under pressure for example, or mechanically, with the help of a screw-threaded spindle or sleeve, which engages in a co-acting screw thread in or on the spindle sleeve.

The difficulties that arise here, for the straight-line guidance of the spindle sleeve with as little play as possible, are conditioned above all by the fact that with the reduction in the guiding clearance of the spindle sleeve in its guiding bore, the lubrication, by the very thin film of lubricant, becomes progressively poorer, so that with the relatively great axial length of the guiding member of the spindle sleeve, which was held to be absolutely essential for a satisfactory central guidance, a metallic contact between the members sliding upon one another, at locally limited places, it may be, is liable to occur, and this in its turn gives rise to seizing or scoring, to vibrations or oscillations (chattering) occasioned thereby, and to rapid wear.

A further source of disturbing vibrations or oscillations is formed by the tool spindle, which, even when of moderate axial length, is liable to swing between its bearings on account of its high-speed of revolution.

The present invention starts from the consideration that for an accurately concentric guidance of the spindle sleeve in the guiding bore of the casing of the fine-boring unit, and also for the non-oscillating supporting of the tool spindle in the front portion of the spindle sleeve, comparatively great axial guiding lengths throughout are not necessary, but that with comparatively short guiding lengths, but correspondingly "stiffer" construction of the spindle-sleeve guide and of the tool spindle, a high degree of machining accuracy is attainable, provided the guiding member of the spindle sleeve is successfully guided, practically without vibration and clearance, and exactly centrally, in the guiding bore.

In the case of the fine-boring unit according to the invention, with a spindle sleeve slidably guided axially in a guiding bore in the casing of the unit, in the end portion thereof at the tool end, which is of smaller diameter than the piston-like guiding portion of the spindle sleeve, the rotationally driven tool spindle is so supported as to be axially undisplaceable and free from play, this problem has been substantially solved by the fact that the spindle sleeve, fitted with its guiding member free from play in the guiding bore, is rotatable in the guiding bore, about the axis thereof, by a special rotary drive.

Owing to the rotary motion of the spindle sleeve in its guiding bore it is possible very largely to reduce the guiding clearance that has been necessary in the case of the spindle sleeves hitherto usual, which are only displaceable axially, and, by suitable construction of the peripheral surface of the member guiding the spindle sleeve, or of the guiding bore, to ensure sufficient lubrication; whilst the guidance free from play, which is equivalent to a "clamping," renders it possible, on the other hand, to reduce the length of the guiding member of the spindle sleeve, and therefore the over-all length of the unit as a whole.

It has been found particularly advantageous to make one of the two surfaces that yield the guidance, that is to say, either the guiding member of the spindle sleeve or the guiding bore, not cylindrical but with a known profile of constant thickness (rounded triangle-polygon), whilst the co-acting bore or guiding member of the spindle sleeve is accurately cylindrical.

By means of a constant-diameter profile, which can be produced with a very high degree of accuracy in a manner known in itself, and the external contour of which need deviate only slightly from a circular contour, the formation of a film of lubricant on the three axial carrying zones of the profile is ensured even when the spindle sleeve is mounted with practically no clearance, and the spindle sleeve is always guided exactly centrally in its guiding bore. On manufacturing grounds the preference is given to the constant-thickness construction of the member guiding the spindle sleeve, since the guiding bore is then exactly cylindrical.

For the feeding and the rotation of the spindle sleeve, mechanical drives, which may advantageously be constructed as worm drives independent of one another, admit of being employed with advantage.

In order also to suppress any play in the mechanical feed drive of the spindle sleeve, according to a further feature of the invention, the spindle sleeve, with its stepped end portion at the tool end projecting through an endwise packing of the guiding bore, is constructed as a stepped piston, so that it can be axially loaded, in the direction of its recoiling displacement, by a pressure medium that can be introduced into the front portion of the guiding bore and that serves at the same time for lubricating the guiding member in the bore. The axial force of the pressure medium opposing the feed, which need only be comparatively small, furthermore prevents injurious results of the "cutting-on shock," which endanger the cutting tool.

The pressure medium penetrates into the peripheral gaps, given by the constant-thickness form of profile, between the guiding portion of the spindle-sleeve and the guiding bore, or passes axially through these gaps, so that the lubrication in the middle of the spindle-sleeve guiding portion is also always ensured. Moreover an oil mist under pressure even admits of being employed as a lubricating pressure medium.

The remarkably good centering that can be attained in the manner described by employing a polygon profile, particularly of a constant thickness, may also be adopted, instead of the ball or roller bearings clamped to one another, for the play-free supporting of the tool spindle in the spindle sleeve, in which case the lubricating of this polygon-circle profile journal bearing can likewise be effected by the same pressure medium that axially loads at one end the spindle sleeve constructed as a stepped piston, and lubricates it in the guiding bore.

Further features and advantages of the fine-boring unit according to the invention will be gathered from the following description of a constructional example, which is illustrated in the accompanying drawings, in which:

FIGURE 1 shows an axial longitudinal section through a fine-boring unit according to the invention;

Figure 3:
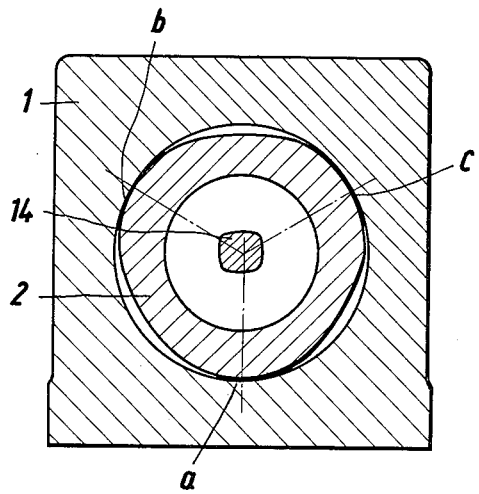
FIGURE 3 is a cross section on the line III—III in FIGURE 1.
Figure 2:
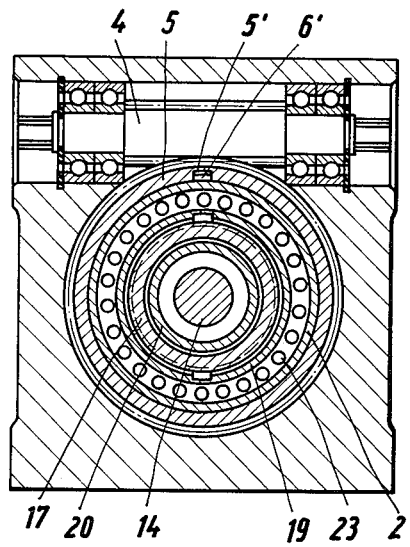
FIGURE 2 is a cross section on the line II—II in FIGURE 1.

The fine-boring unit illustrated in the drawings contains, in its thick-walled and therefore very vibration-free casing 1, a spindle sleeve 2, which is constructed like a stepped or differential piston, and is guided or journalled without clearance in the smooth guiding bore 1a of the casing 1 by a comparatively short central guiding portion 2a. The end portion 2b, at the tool end of the spindle sleeve, is off-set to a smaller diameter than the guiding portion 2a, and the rear portion 2c of the spindle sleeve is likewise reduced in diameter relatively to the guiding portion 2a, thus giving rise to two annular step surfaces 2' and 2", which are of different sizes. At the two ends of the guiding bore 1a, inlet apertures 3 and 3' are provided, through which a pressure medium can be introduced, from a pressure storage, into the space in the guiding bore which is bounded inwards by the spindle sleeve 2. This pressure and lubricating medium may be a lubricating oil; but it is also possible with advantage to introduce into this space finely atomised oil under pressure. The difference in size between the two annular surfaces 2' and 2" has the result that the pressure medium exerts an axial pressure upon the spindle sleeve, and this pressure acts in the direction of a recoil displacement of the spindle sleeve, and thereby eliminates the assembly play of all parts in the longitudinal direction.

The rotating of the spindle sleeve is effected by means of a worm 4, which engages in worm-wheel teeth cut into a sleeve 5. The sleeve 5, rotatably supported in the casing 1 concentrically with the guiding bore 1a, has in its bore an axial groove 5a. On the end face of the rear end section 2c of the spindle sleeve 2 is secured a tappet or driving ring 6, screwed in for example, which is provided with an outwardly projecting radial lug 6a, which engages in the axial groove 5a of the sleeve 5, and thus couples the spindle sleeve rotationally fast to the rotatable sleeve 5. In an axial direction the sleeve 5 is guided between an insertion ring 7 containing annular packings 8, which seal the guiding bore 1a from the rear, and the outer ring of one of two ball or roller bearings 9 of the feeding drive, to be hereinafter more fully described, of the spindle sleeve. The spindle sleeve, on the whole of its stroke length, is constantly rotated by its positive coupling to the sleeve 5. By this rotation the result is obtained that very small unavoidable errors of concentricity of the individual parts are compensated for.

The play-free supporting of the spindle sleeve 2 in the guiding bore 1a is made possible by the fact that the guiding portion 2a of the spindle sleeve, as shown in FIGURE 3, is of constant-thickness profile. The spindle sleeve bears, as can clearly be recognised from FIGURE 3, with the three peak zones a, b and c of its constant-thickness profile, which differs only very slightly from the circular form, against the cylindrical internal surface of the bore 1a, whilst the narrow gaps located between these zones afford to the lubricant a passageway right into the middle or towards the end of the guiding member 2a.

The front closure of the guiding bore 1a is formed by a cover 10, with annular packings 11 and 12. By the annular packing 11 the end portion 2b at the tool end of the spindle sleeve 2 is sealed as it projects through, but is not rigidly guided.

Into the spindle sleeve 2 the work spindle 13 is fitted without clearance. Its ball or roller bearings 13a, clamped axially to one another, are both located in the part 2b of the spindle sleeve off-set towards the tool end, so that any heating of the bearings occurring at high speeds of revolution cannot in any case give rise to any undesirable radial expansion of the guiding portion 2a of the spindle sleeve. The work spindle 13 is comparatively short, and is constructed with a stout cross section, so that even at high speeds of revolution it does not pass into a state of unsteady oscillation.

The work spindle 13 is driven by a shaft 14, which is profiled as a four-cornered polygon, and engages in a correspondingly profiled bore in the work spindle 13 with smooth fitting. The shaft 14 is guided by its rear end 14a in a tappet or driving sleeve 16, which in its turn is connected rotationally fast with a belt pulley 15. The belt pulley is journalled in an extension 1b of the casing by way of duplicate ball bearings 15a.

A feed spindle 17, constructed as a tube, which is likewise rotationally mounted in the casing extension 1b, has on its rearward end portion a broad outer collar 17a, into which are cut the teeth of a worm wheel, with which there meshes a driving worm 18, which in its turn is likewise mounted in the casing extension 1b.

The tubular feed spindle 17, by an external screw thread, meshes with an internal thread at the upper end of a longitudinally slidable nut sleeve 19. This nut sleeve 19 has internal axial grooves 19a, in each of which there engages a guiding key 21, which is mounted fast on a sleeve 20 connected with the casing 1, and secures the nut sleeve 19 against rotation.

When the tubuar feeding spindle 17 is rotated about its axis, it imparts to the nut sleeve 19 a feeding movement, which is transmitted to the spindle sleeve by way of a ring of balls 23, which are arranged in a peripheral groove 22 in the spindle sleeve, and which also engage in a peripheral groove in the nut sleeve 19. The balls 23 are pressed into the encircling groove of the nut sleeve 19 by way of a thrust ring 24 guided in the groove 22 of the spindle sleeve, by a spring 25 axially loading this ring, and they form, between the nut sleeve 19 and the spindle sleeve 2, a feed coupling which yields resiliently at a high axial thrust.

When the spindle sleeve 2 arrives at its front abutment, formed by the ring 10, or in some cases by an insertion inserted in front of the ring, while the feeding spindle 17 continues to turn, thereby further displacing the nut sleeve 19, the balls 23 are pushed out of the groove encircling the nut sleeve 19, with resilient yielding of the thrust ring 24, so that further movement of the nut sleeve 19 can be freely continued until the stoppage of the drive.

The nut sleeve 19 transmits its feeding movement also to the central shaft 14, by way of a ball bearing 26. The additional feeding movement of the central shaft 14 upon stoppage of the spindle sleeve 2 may be utilised for the actuation of further movements of tools, for instance of a cross-feed in the tool head.

The shutting off of the feed drive is effected for instance by means of stops in conjunction with a torque-limiting safety switch in the feeding gear. Upon the return of the spindle sleeve, the nut sleeve 19 is at the same time brought into its initial position, as shown in FIGURE 1.

It has been found that for the improvement of the smooth running of the tool spindle 13, the rolling bearing of the tool spindle, which, in the constructional example, is provided by two ball bearings axially clamped to one another and thereby rendered free from play, can also be made completely "chatter-free" by also providing the tool spindle, in the front internal bore of the spindle sleeve, with a constant-thickness profile fitted accurately into this bore, which, as explained above for the bearing guidance of the spindle sleeve, yields a practically play-free supporting. Even with the very high speeds of revolution of the tool spindle, within the front stepped portion of the spindle sleeve, a satisfactory and accurately co-axial supporting is in this way attainable, wherein a film of lubricant, though only a very thin film is always maintained between the rounded corners of the constant-thickness profile and the cylindrical bearing bore.

The supply of lubricant may be effected by providing at least one radial bore 27 in the wall of the stepped portion of the spindle sleeve, to connect the space between this stepped portion of the spindle sleeve and the guiding bore of the casing with the space inside the spindle sleeve, thus forming a passage for the pressure medium forced into this space, for instance an atomised oil, for the journal bearing of the spindle.

Journal bearings very extensively free from play, in which the "shaft" is constructed as a polygon profile, particularly as a constant-thickness profile, also admit of being adopted in the case of further journal bearings of the fine-boring unit. They may for instance be provided between the sleeve 20 fixedly connected with the casing 1 and the tube of the feeding spindle 17, and also between the lower end of the nut sleeve 19 and the internal bore of the guiding portion 2a of the spindle sleeve 2.

In conclusion it may also be mentioned that the fine-boring unit according to the invention may be utilised for building up multi-spindle fine-boring blocks, in which a plurality of such units are assembled in the particular arrangement desired, for instance side by side in a row. The drives of the units then admit of being coupled together. Thus the belt pulleys 15 of all the units may be driven by way of a common belt drive from a single motor. The worms of the two worm drives, for the rotating and for the feeding of the spindle sleeves admit of being axially coupled together directly, and alternatively of being driven each by a separate driving motor. Finally, in a manner known in itself, adjustable abutments may be provided in the feeding drive of the spindle sleeve, to serve for the stroke-limiting automatic recoil control, and so forth.

We claim:
1. A fine-boring unit, with a spindle sleeve slidably guided axially in a guiding bore of the casing of the unit, in the end portion of which, at the tool end, which is of smaller diameter than the piston-like guiding portion of the spindle sleeve, the rotationally driven tool spindle is so supported as to be free from play and axially undisplaceable, characterised by the feature that the spindle sleeve (2), mounted with its guiding member (2a) without play in the guiding bore (1a), is rotatable by a special rotary drive (4, 5, 6) in the guiding bore about the axis of the spindle sleeve.

2. A fine-boring unit as claimed in claim 1, characterised by the feature that either the guiding member (2a) of the spindle sleeve or the guiding bore (1a) has a constant-thickness profile (rounded triangle-polygon), whilst the co-acting bore or guiding member of the spindle drive is cylindrical.

3. A fine-boring unit as claimed in claim 1, characterised by the feature that for the feeding and for the rotating of the spindle sleeve, mechanical drives (18, 17, 19 or 4, 5, 6) are employed.

4. A fine-boring unit as claimed in claim 1, characterised by the feature that the drives for feeding and for rotation of the spindle sleeve are worm drives which are independent of one another.

5. A fine-boring unit as claimed in claim 1, characterised by the feature that the spindle (2), projecting with its off-set end portion (2b) at the tool end, through a packing (10) at the end of the guiding bore (1a), is constructed as a stepped or differential piston, and can be axially loaded in the direction of its recoil displacement by a pressure medium which can be introduced into the front portion of the guiding bore, and which serves at the same time for lubricating the guiding portion in the bore.

6. A fine-boring unit as claimed in claim 5, characterised by the feature that the pressure medium is an atomised oil which is subject to a raised pressure.

7. A fine-boring unit a claimed in claim 1, characterised by the feature that the means for the practically play-free supporting of the tool spindle in the spindle sleeve is a polygon-circle-profile journal bearing.

8. A fine-boring unit as claimed in claim 5, characterised by at least one radial bore (27) in the wall of the stepped spindle-sleeve portion (2b), which connects the space between this stepped portion of the spindle sleeve and the guiding bore (1a) with the interior of the spindle sleeve, and forms a passage for the pressure medium forced into this space to the spindle bearing.

No references cited.

WILLIAM W. DYER, JR., *Primary Examiner.*